H. P. CHILDRESS.
COMBINED BALE TIE BUCKLE AND IDENTIFICATION TAG.
APPLICATION FILED JUNE 21, 1913.
1,121,799.
Patented Dec. 22, 1914.
2 SHEETS—SHEET 2.
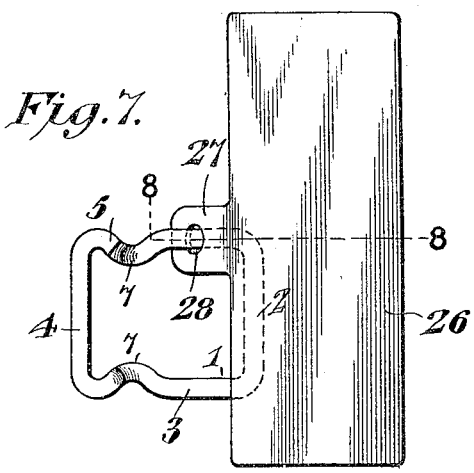
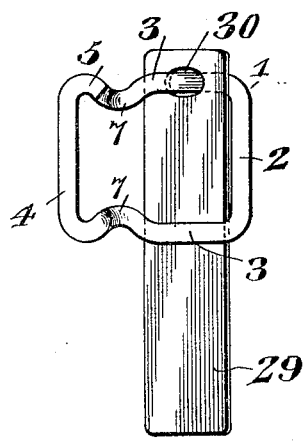
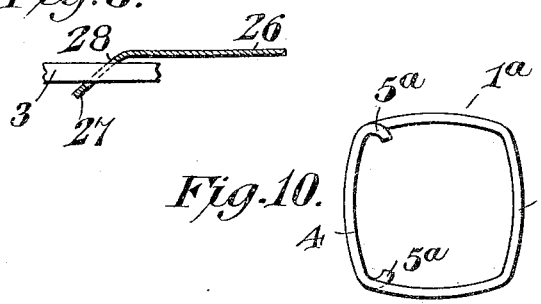
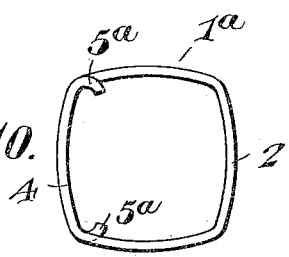
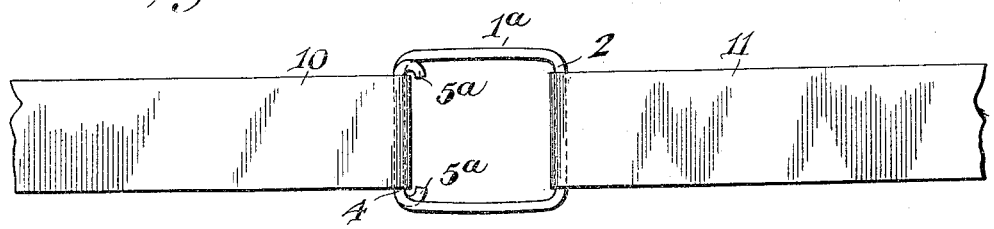
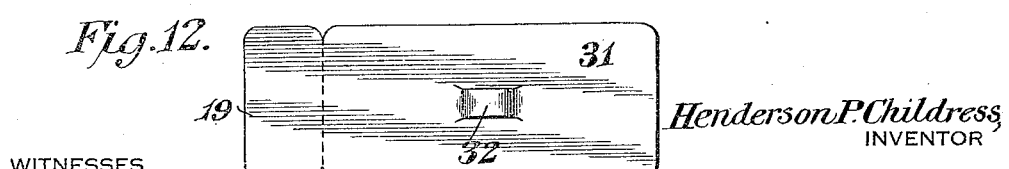
Henderson P. Childress
INVENTOR
WITNESSES
Jas. K. McCathran
H. T. Chapman.
BY
C. G. Siggers
ATTORNEY

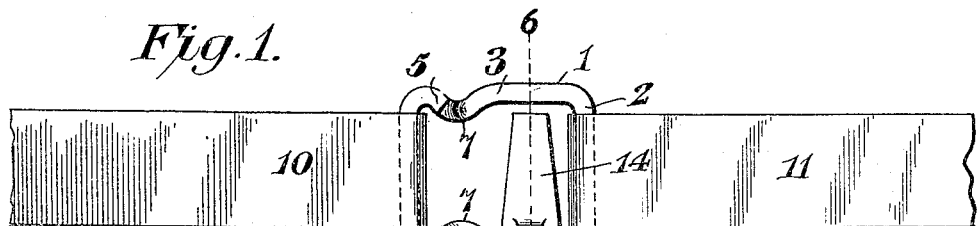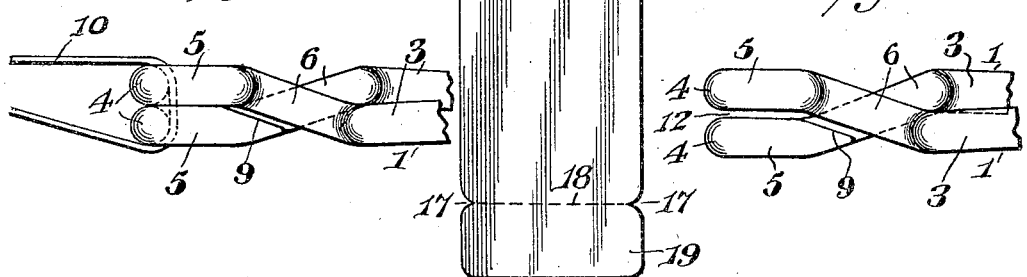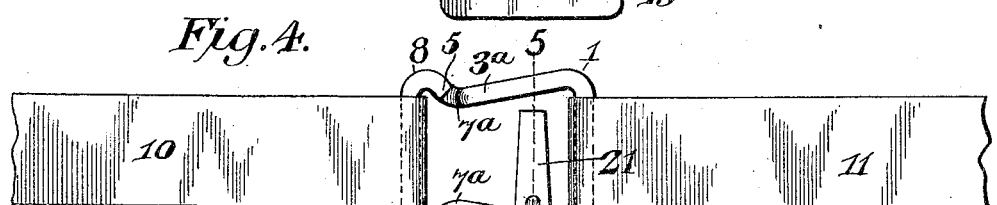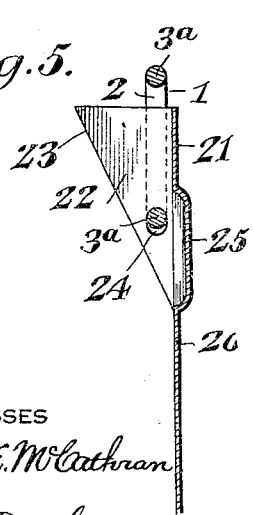

UNITED STATES PATENT OFFICE.

HENDERSON P. CHILDRESS, OF MEMPHIS, TENNESSEE.

COMBINED BALE-TIE BUCKLE AND IDENTIFICATION-TAG.

1,121,799.  Specification of Letters Patent.  Patented Dec. 22, 1914.

Application filed June 21, 1913. Serial No. 775,114.

*To all whom it may concern:*

Be it known that I, HENDERSON P. CHILDRESS, a citizen of the United States, residing at Memphis, in the county of Shelby and State of Tennessee, have invented a new and useful Combined Bale-Tie Buckle and Identification-Tag, of which the following is a specification.

This invention has reference to improvements in combined bale tie buckles and identification tags, and its object is to provide a buckle to which the band may be expeditiously applied without liability of improper union of the bale band and buckle, and without material loss of compression of the bale, and to provide an identification tag so united to the buckle that it cannot escape therefrom, and will, therefore, serve as a positive identification for the particular bale to which it is applied even in the event of the destruction of such a bale.

It is the custom in the cotton baling industry to employ bale bands of strap iron, and the ends of these bands are returned upon themselves and are united by buckles. One type of buckle is made of wire bent into a loop with one end so constructed that the looped ends of the bale band may be applied thereto, the expansive force of the tightly compressed cottom bale serving to hold the buckle in a position preventing the escape of the band. As heretofore constructed such buckles have been open to the objection that they either pull open under the great expansive force of a tightly compressed cotton bale, or they are so related to the bands as to tend to tear the latter where engaging them.

In accordance with the present invention there is provided a one-piece buckle bent into loop form preferably approaching a square in general outline, and with the terminal portions each extending from a respective side toward the distant side of the loop and there terminating in a return portion constituting a hook, each side portion being offset laterally to overhang or house the adjacent hook end, and also being shaped to direct an applied bale band in a manner that it cannot lodge against the hooked end. With such a construction the looped end of the bale band may be introduced between the adjacent extremities of the loop which lie side by side and are slightly spaced to permit the introduction of the looped end of a flat bale band, the movement being continued until the looped end of the bale band is in embracing relation to one of the sides of the buckle, whereupon it may be returned to the entering end of the loop, and the act of returning it to such position causes the directing of the looped end of the bale band into embracing relation to both of the oppositely directed extremities of the loop into intermediate relation to the hooked ends, this operation being performed by turning the buckle appropriately, while the opposing ends of the bale band are in substantial alinement. Now upon the release of the compressed bale it tends to expand, and the expansive force so exerted tends to elongate the buckle, and this elongation causes an approach of the hooked ends which engage over the corresponding side edges of the terminal loop of the bale band. With such a structure no force directed lengthwise of the bale band which either the band or the buckle can withstand without rupturing is sufficient to straighten out any portion of the buckle, while the open end of the buckle which is naturally the weakest point, cannot so yield as to permit the escape of the bale band from the inwardly bent hooked ends.

It has heretofore been customary to place identification marks upon bales of cotton, either by painting such marks upon the burlap covering of the bale or applying identification tags, but with both of these methods the loss from the obliteration of the painted marks or the malicious or accidental removal of the identification tags is very great. The present invention contemplates the avoidance of such loss by making the identification tag of a material, preferably metal, which will withstand the destruction of the cotton by fire, and also will withstand handling during shipment and which cannot by any means short of the destruction of the tag result in the loss or misplacing of the tag with reference to the particular bale to which it is attached. To bring this about the tag is so constructed and so related to the type of buckle employed that it may be readily threaded on to the buckle so as to remain on one side thereof between the two ends where the bale band is applied without possibility of loss either before or after the band is applied to the bale, and the tag is so constructed that it may be threaded upon the buckle at the same time the buckle is first applied to one end of the bale band, and before being placed in encircling relation to the bale. Furthermore, the peculiar construction of the buckle with the offsets and curves providing for the final application of the bale band to the buckle prevents the escape of the tag after having been once threaded on the buckle, no matter to what extent or how roughly the bale band may be handled in the interval between the threading on of the tag and the application of the band to the bale. Moreover, the improved tag may be so shaped that it may lie flat upon the bale in close hugging relation thereto, thus preventing any disturbance of the tag by the engagement of the bales with each other or with anything else during shipment.

All these features will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified, so long as such changes and modifications mark no material departure from the salient features of the invention.

In the drawings:—Figure 1 is a plan view of a bale tie buckle and tag as applied to a bale, and both embodying the present invention. Fig. 2 is a fragmentary edge view on a somewhat exaggerated scale with the parts in the position assumed when applied to a bale. Fig. 3 is a view similar to Fig. 2 but showing the position of the parts previous to the application of the bale band. Fig. 4 is a view similar to Fig. 1 but showing a different type of buckle and tag. Fig. 5 is a section on the line 5—5 of Fig. 4. Fig. 6 is a section on the line 6—6 of Fig. 1. Fig. 7 is a view of a buckle similar to that shown in Fig. 1 but showing another form of tag. Fig. 8 is a section on the line 8—8 of Fig. 7. Fig. 9 is a view of a buckle similar to that shown in Fig. 1 but illustrating a different type of tag. Figs. 10 and 11 are views illustrating the anchoring action of the hook extremities of the buckle. Fig. 12 is a face view of a modified form of tag.

Referring to the drawings, there is shown a buckle 1 which may be made of a single piece of wire or other suitable material, but throughout the specification and claims the term wire will be used not only to designate an elongated metallic strand with which the term is customarily associated, but any elongated strip suitable for the purposes of the present invention.

The wire loop is so bent as to form an intermediate yoke portion 2, and side portions 3, which may be in parallel relation as in Figs. 1, 7 and 8, or in approaching relation, as indicated at 3ª in Fig. 4, and these side portions are again bent to form extensions 4 which may be in substantially or approximately parallel relation to the yoke portion 2 and each of a length to reach the corresponding portion of the distant side of the loop, and at the ends these extensions 4 are returned upon themselves to form inwardly directed hooks 5. Each side portion 3 immediately adjacent to its junction with the corresponding extension 4 is laterally offset, as indicated at 6, and is also formed with an inwardly directed shoulder 7. In Fig. 1 and associated figures the shoulder 7 is formed by a relatively sharp bend of the side 3 toward the other side of the loop, while in Fig. 4 the same result is accomplished by an outbending of the sides 3ª of the loop as indicated at 8. This outbending in conjunction with the tapering of the sides 3ª forms shoulders 7ª having the same functions as the shoulders 7 of the form illustrated in Fig. 1.

The extremities of the hooks are beveled on one side as indicated at 9 for a purpose which will hereinafter appear.

The two ends of a bale band are indicated at 10 and 11, respectively, and these ends are returned upon themselves as is customary to form terminal loops. Before the bale band is applied to a bale one of the terminal loops, say the end 11, has a buckle applied thereto by passing one of the extremities 4 through the loop, and then returning the buckle until the applied loop is in encircling relation to the yoke or closed end 2 of the buckle. Now, when the bale band has been applied to a compressed bale, the other loop end 10 of the band is applied to the buckle by being passed over one extremity 4 of the buckle and the latter is then rotated until both loops 10 and 11 engage respectively opposite sides 3 of the buckle. The buckle is then rotated in the opposite direction until the last applied end of the bale band is brought into encircling relation to both extensions 4 of the sides 3 and upon the release of pressure upon the bale the expansion of the latter causes a strain to be put upon the buckle in the direction of the length of the sides of the buckle, thus tending to elongate it and thereby causing an approach of the hooked ends 5 one toward the other until the extremities of these hooks are in overhanging relation to the sides of the bale band, and further approaching movement of the hooks is arrested.

Under normal conditions and before the buckle is applied to the bale band each hooked end 5 offstands a short distance from the corresponding offset portion 6 leaving a space as shown at 12 in Fig. 3, for the introduction of the bale band between the overlapping extensions 4. When, however, the buckle is under stress due to the expansion of the bale, the extremities 4 are brought into side contact and are very firmly held, as shown in Fig. 2 with the bevel end 9 in close relation to the corresponding part of the offset portion 6 and the hooked ends are therefore guarded against liability of being caught by other bales or anything with which they may come into contact. Because the extremities 4 are in separated relation to permit the ready introduction of the bale band into the buckle there would be great liability of the bale band, after being introduced into the buckle and returned toward the open end of the buckle, to pass again between the extensions 4 or to lodge against the end of one of the hooks 5, and thereby so imperfectly engage the buckle as to cause the latter to spread as soon as the bale is relieved from the pressure of the press. Again, if it were not for the presence of the shoulders 7 or 7ª, as the case may be, the return movement of the bale band loop from the side of the buckle toward the entering end thereof would be liable to cause an engagement of the band with the corresponding hook 5 and a careless operative would be liable to leave the buckle but partially turned toward its final position, and this would result in the pulling apart of the buckle and cause a loosening of the band.

The effect of the hooked ends 5 is more or less schematically indicated in Figs. 10 and 11 although a buckle similar to the showing of these figures might be employed, but not with so great an advantage as that of the other figures. The structure illustrated in Figs. 10 and 11 also indicates the feasibility of the employment of much lighter stock than heretofore due to the employment of the hooked ends 5. The buckle 1ª of Figs. 10 and 11 is shown as approximately square in outline with the extremities at the entering ends returned upon themselves sufficiently to form hooks 5ª. Now, on the application of the ends 10 and 11 of the bale band there is a tendency of the buckle, which may be of more or less rounded contour, to elongate, but this results in an approaching movement of the hooks 5ª until they engage over the offset edges of the corresponding looped end of the band and even though the gage of the buckle 1ª be such that the entering end would readily pull out under the force exerted thereon, such tendency is completely resisted by the hooks 5ª having approaching ends due to the inward curve thereof, for experience has shown that the buckle will rupture before such inturned hooks will straighten out.

In Fig. 1 there is shown a tag 13 having at one end an extended lip 14, the extension of the lip being in line with the longitudinal center line of the body of the tag 13. About where the lip joins the body of the tag the lip is struck up as indicated at 15 to form a loop, this being facilitated by producing two spaced slits 16 in parallel relation one with the other. That end of the tag 13 remote from the tongue 14 is indented on opposite sides as shown at 17, and between these indentations the body of the tag may be weakened by other indentations 18, or in any other appropriate manner, so that there is a terminal portion 19 remote from the lip 14 which may be readily detached by tearing it off from the body of the tag even though the tag be made of sheet metal.

When the end 11 of the bale tie is applied to the buckle 1 the tag 13 may likewise be applied by introducing one of the extensions 4 through the struck up loop 15 and moving the tag on to one of the sides 3, so that the body of the tag offstands from the buckle in substantially perpendicular relation to the length of the bale band. Now, by reason of the shoulder 7 and offset portion 6 the tag cannot escape from the buckle after having been once placed thereon, since even when roughly handled prior to the application of the bale band to the bale the tag will not follow the tortuous course which it must in order to escape from the buckle. When the buckle with the tag is applied to a bale and secured thereto and the bale is released from the press the expansion of the bale causes the material thereof to press upon the tag both upon the body portion and upon the lip 14 which are located on opposite sides of the side 3 of the buckle holding the tag, wherefore the tag is caused to tightly hug the bale and may even become somewhat embedded therein so that during transportation or during handling of the bale the tag is wholly protected from liability of snagging with anything, and hence it remains uninjured at all times.

It is customary to place a serial number upon the lip 14, or upon the body of the tag, and upon the detachable portion 19, which latter may be removed at the time the cotton is baled. In addition to the serial number, the body of the tag presents a space for the name of the owner, or shipper, or buyer, together with the date and class mark, or any other identifying characters. After the buckle is applied to the bale it is absolutely impossible for the tag to accidentally escape from the bale except under such circumstances as would prove destructible to the bale band and tag. Surreptitious removal of the tag is difficult. Even in case of fire, the tags remain permanently attached to the bale bands and buckles and hence serve as a means for identifying the destroyed property.

Prior to the present invention identifying means for cotton bales have been of a character which may be easily obliterated or removed, so that large losses have been incurred either through accident or malicious intent. Where the identification marks are painted upon the burlap covering of the cotton bale, the rubbing together of the bales or other causes frequently result in so great an obliteration of such marks that identification is impossible. All tags which have heretofore been employed for identification have been provided with attaching devices permitting the ready removal of the tag either maliciously or accidentally, so that great losses have occurred from such causes.

With the present arrangement the tags become an absolutely permanent part of the bale to be separated therefrom only by the breakage of the material of the tag or the bale band, and as the tags may be made so cheaply as to permit the use of as many tags on a bale as there are bale bands, the liability of loss is reduced to a negligible minimum, and even in the case of the total destruction of the bale by fire the total shipment may be readily identified.

While the structure shown in Fig. 1 is a preferred form, the tags may be otherwise constructed, as, for instance, they may be formed as shown in Figs. 4 and 5, where there is indicated a tag 20 of the same general form as that shown in Fig. 1 with a lip 21 which may have side portions 22 folded one toward the other and shaped to increase the thickness of the tongue with respect to the plane of the tag body 20 from the joint of junction of the tongue with the body of the tag toward the free end thereof, and this thickened portion 22 may have a general bevel, indicated at 23. Formed through the side members 22 of the tongue 21 are matching perforations 24 designed to permit the tongue to be threaded upon the buckle and when the tag is in the same relation to the buckle as shown in Fig. 1 the engagement of the bale with the thick end of the lip 21 remote from the body of the tag 20 tends to force the body of the tag firmly against the body of the bale, so that it may become embedded even more deeply into the bale than in the form shown in Fig. 1. To strengthen the portions of the tongue 21 with the body of the tag 20, there may be a struck up rib 25 formed therein and extending into both.

Still another form of tag is illustrated in Figs. 7 and 8, and in this form there is shown a tag 26 having a tongue 27 intermediate of one long side, and this tongue is provided with a perforation 28 and is also bent at an angle to the plane of the body of the tag so that it may be threaded upon a buckle with the tag overlying the buckle, and because of the engagement of the lip 27 with the cotton the body of the tag is held in firm hugging relation to the bale in a manner similar to that described with reference to the other forms.

Even so simple a form of tag as illustrated in Fig. 9 may be employed, in which case there is shown a tag 29 of simple plate form with an elongated opening 30 near one end, so that the tag may be threaded upon a buckle in angular relation thereto, so as to be engaged by the under side of the buckle against the cotton bale and thereby forced into contact with the body of the bale.

While the tag 13 shown in Fig. 1 is indicated as provided with a tongue 14, such tongue may be omitted. A tag with such tongue omitted is shown at 31 in Fig. 12, and at an intermediate point in the body of the tag there is a struck up loop 32 similar to the loop 15 of the tag 13 and this tag may also be provided with a removable portion 19 as in Fig. 1, which removable portion may constitute a part of any of the tags shown in the drawings. With a structure such as shown in Fig. 12 the buckle may overlie the tag the same as in the case of the tag 29 shown in Fig. 9, and thus anchor the tag flat against the bale with the whole pressure exerted thereagainst, but still not interfering with the clear reading of the tag. Since such a tag is pressed down into the bale by the full force exerted by the buckle it cannot be removed either accidentally or maliciously.

No claim is made herein to the buckle *per se*, since claims directed to the buckle are made in my application No. 805,992, filed December 11, 1913, for improvements in bale band buckles. In the said later application not only are there disclosed the forms of buckle herein shown, but other forms of buckle embodying the same general principles of construction and operation are disclosed, and the various forms of identification tags herein disclosed may be employed with those forms of buckle shown in the said later application, but not herein disclosed, so that it will be understood that the present invention is of wide scope with respect to the structure of the tag and of the buckle.

What is claimed is:—

1. A combined bale band buckle and identification tag, comprising a buckle in the form of a loop having an entering end to receive and be closed by one end of a bale band, and an elongated tag with a passage therethrough by way of which the tag is threaded on to one side of the buckle through the entering end, whereby the tag is held against the bale by the expansive force of the latter exerted on the bale band and buckle with the longitudinal axis of the tag substantially perpendicular to the length of the bale band.

2. A combined bale band buckle and identification tag, comprising a buckle in the form of a loop with an entering end to receive and be closed by one end of a bale band, and a tag with a passage therethrough by which the tag is threaded on to one side of the loop through the entering end of the latter, said buckle having means for holding the tag against accidental escape in the absence of a bale band.

3. A combined bale band buckle and identification tag, comprising a buckle of loop form having a lapped entering end, and a metallic tag having therethrough a passage with the walls integral throughout and threaded by way of the passage on to one side of the buckle through the entering end of the latter, the passage through the tag being situated to one side of the plane of the latter, whereby the tag, when the buckle and tag are applied to a bale, is held by the buckle substantially flat against the bale.

4. A combined bale band buckle and identification tag, comprising a buckle and a tag having a passage therethrough to one side of the plane of the body of the tag and threaded on to the buckle, said buckle having means to prevent accidental escape of the tag therefrom.

5. A combined bale band buckle and identification tag comprising a buckle having a lapped entering end, and a tag having a lip at one end with a passage between the free end of the lip and the body of the tag, the buckle being threaded through said passage.

6. A combined bale band buckle and identification tag, comprising a buckle of loop form having a lapped entering end, and a substantially flat tag provided with a lip projecting from one end thereof and having a struck-up loop adjacent to the junction of the lip with the body of the tag, the buckle being threaded through the loop so formed.

7. The combination with a bale band buckle, of an identification tag threaded thereon in offset relation thereto, whereby the tag is held against the bale by the pressure exerted on the tag by the buckle under the expansive force of the bale.

8. A combined bale band buckle and identification tag comprising a buckle in the form of a loop, and a tag with a passage therethrough and threaded by way of the passage on to one side of the buckle, said buckle being provided with a stop for holding the tag against accidental escape from the buckle in the absence of the bale band.

9. A combined bale band buckle and identification tag comprising a buckle of loop form, and a tag with a passage therethrough and threaded on to one side of the loop by means of the passage, said tag being elongated and extending laterally of the buckle when applied to a bale with a part of the tag within the area defined by the buckle and a part exterior thereto, whereby the tag is held by said buckle substantially flat against a compressed bale under the expansive force of the latter.

10. A combined bale band buckle and identification tag comprising a buckle having separable portions for the introduction of the bale band into the buckle and locked together by the applied bale band, and the tag having a passage therethrough for application of the tag to the buckle through the separable portions thereof, the tag and buckle having coacting parts whereby the tag is held substantially flat against a compressed bale by the expansive force of the bale exerted upon the tag through the buckle.

11. A combined bale band buckle and identification tag with the tag having a passage therethrough for threading the tag upon one side of the buckle, with a portion of the tag extended crosswise of the buckle within the area defined by the latter, whereby the tag is held substantially flat against the bale to which the buckle and tag are applied by the expansive force exerted by the bale upon the tag through the buckle.

12. A combined bale band buckle and tag comprising a buckle having parts movable toward and from each other, and a tag with a passage intermediate of its length for threading the tag on to the buckle through the movable parts thereof, the buckle being provided with stop means for the tag to prevent accidental escape of the latter from the buckle after being threaded thereupon and prior to the final application of a bale band.

In testimony, that I claim the foregoing as my own, I have hereto affixed my signature in the presence of two witnesses.

HENDERSON P. CHILDRESS.

Witnesses:
  JOHN H. SIGGERS,
  E. G. SIGGERS.